United States Patent
Kayama et al.

(10) Patent No.: US 7,532,601 B2
(45) Date of Patent: May 12, 2009

(54) TRANSMISSION POWER CONTROL METHOD, RADIO COMMUNICATION SYSTEM, BASE STATION AND MOBILE STATION

(75) Inventors: Hidetoshi Kayama, Yokohama (JP); Lan Chen, Yokohama (JP); Narumi Umeda, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 971 days.

(21) Appl. No.: 10/624,513

(22) Filed: Jul. 23, 2003

(65) Prior Publication Data

US 2004/0105406 A1 Jun. 3, 2004

(30) Foreign Application Priority Data

Jul. 24, 2002 (JP) ............... 2002-215764

(51) Int. Cl.
*H04B 7/216* (2006.01)
*H04B 7/00* (2006.01)

(52) U.S. Cl. .................... 370/335; 455/522

(58) Field of Classification Search ............ 370/335, 370/342, 441, 479, 235, 236, 252; 455/522
See application file for complete search history.

(56) References Cited

U.S. PATENT DOCUMENTS

| | | | | |
|---|---|---|---|---|
| 6,438,387 B1 * | 8/2002 | Ichikawa | ............. | 455/522 |
| 6,542,718 B1 * | 4/2003 | Kuo et al. | ............. | 455/69 |
| 6,907,260 B1 * | 6/2005 | Tsunehara et al. | ...... | 455/522 |
| 7,065,183 B1 * | 6/2006 | Raaf | ................. | 379/74 |
| 7,277,721 B2 * | 10/2007 | Okumura et al. | ....... | 455/522 |
| 2001/0023188 A1 * | 9/2001 | Komatsu | ............. | 455/522 |
| 2002/0077111 A1 | 6/2002 | Spaling et al. | | |
| 2008/0037474 A1 * | 2/2008 | Niwano | ............. | 370/335 |

FOREIGN PATENT DOCUMENTS

| | | |
|---|---|---|
| JP | 08-084365 | 3/1996 |
| JP | 10-056421 | 2/1998 |
| JP | 2000-224104 | 8/2000 |
| WO | WO 00/55976 | 9/2000 |

\* cited by examiner

*Primary Examiner*—Aung S Moe
*Assistant Examiner*—Feben Haile
(74) *Attorney, Agent, or Firm*—Oblon, Spivak, McClelland, Maier & Neustadt, P.C.

(57) ABSTRACT

The object of the present invention is to provide a transmission power control method which enables the resolution of problems in a first control method for keeping the received power of packet signals in upstream radio channels constant and a second control method for keeping the SIR constant. The present invention relates to the transmission power control method for controlling the transmission power control of packet signals transmitted from a mobile station 30 via an upstream radio channel. The method comprises a step of measuring the traffic volume of the packet signals and a step of switching between the first control method and the second control method.

11 Claims, 7 Drawing Sheets

Background Art

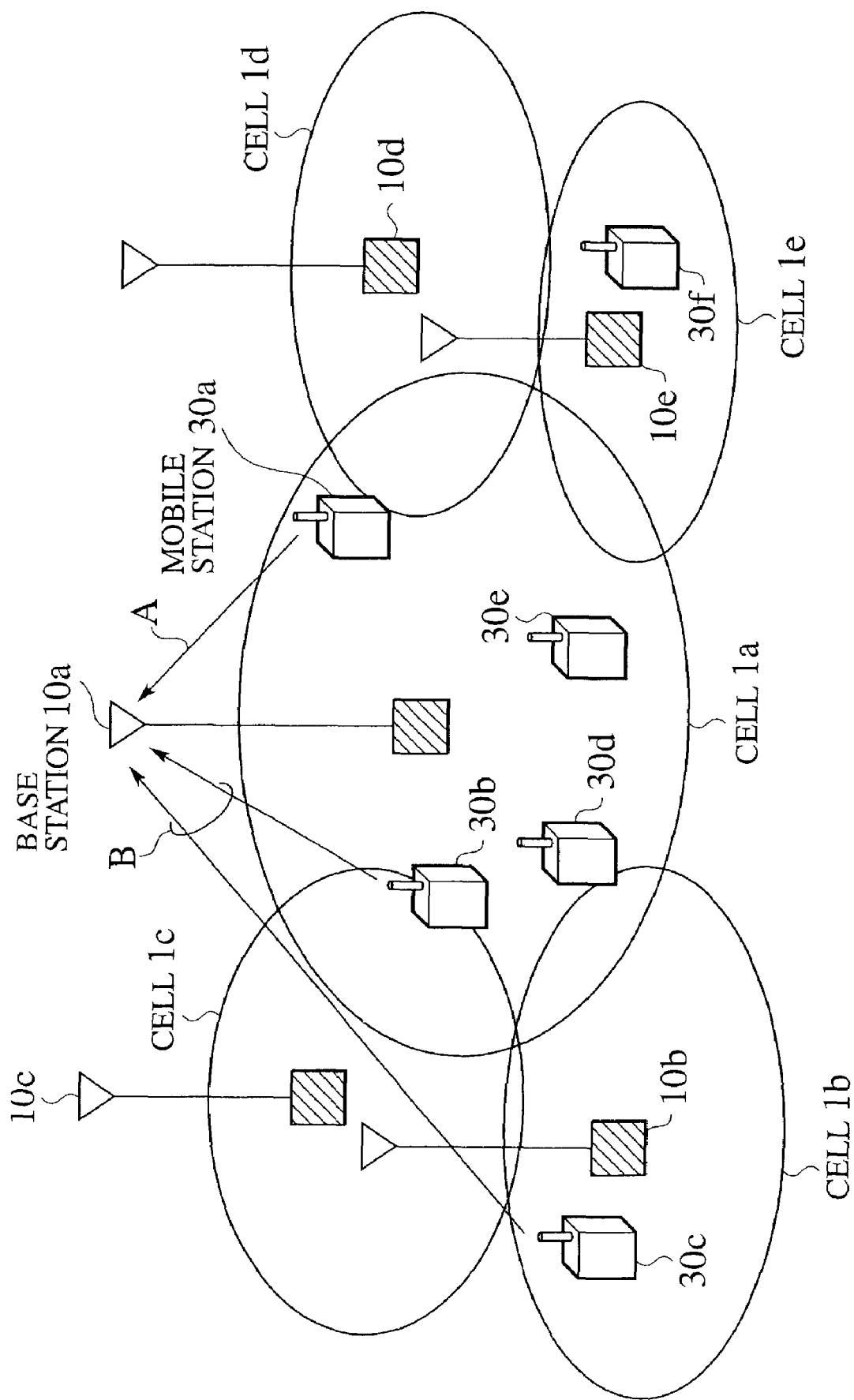

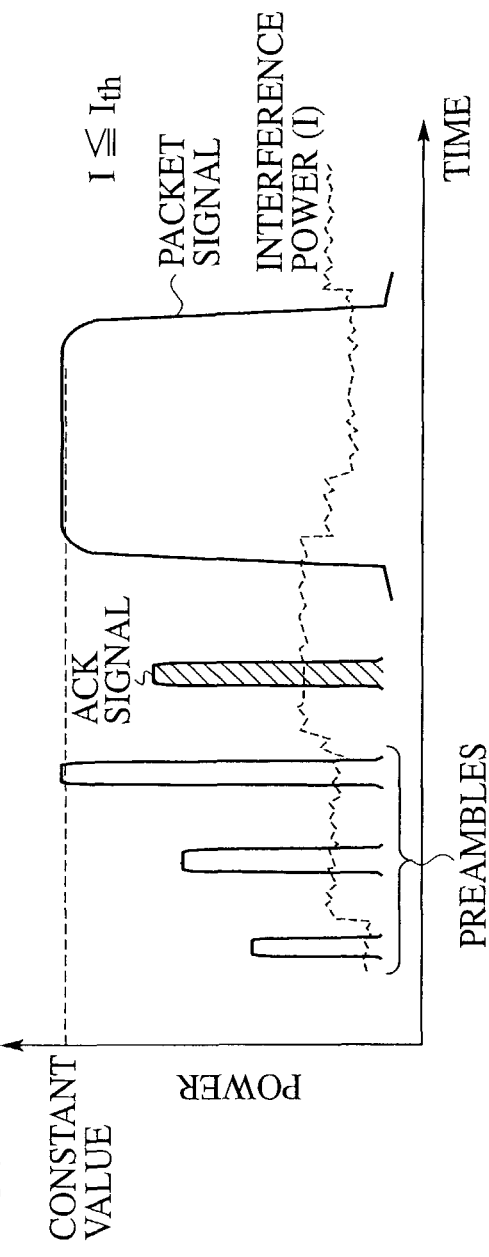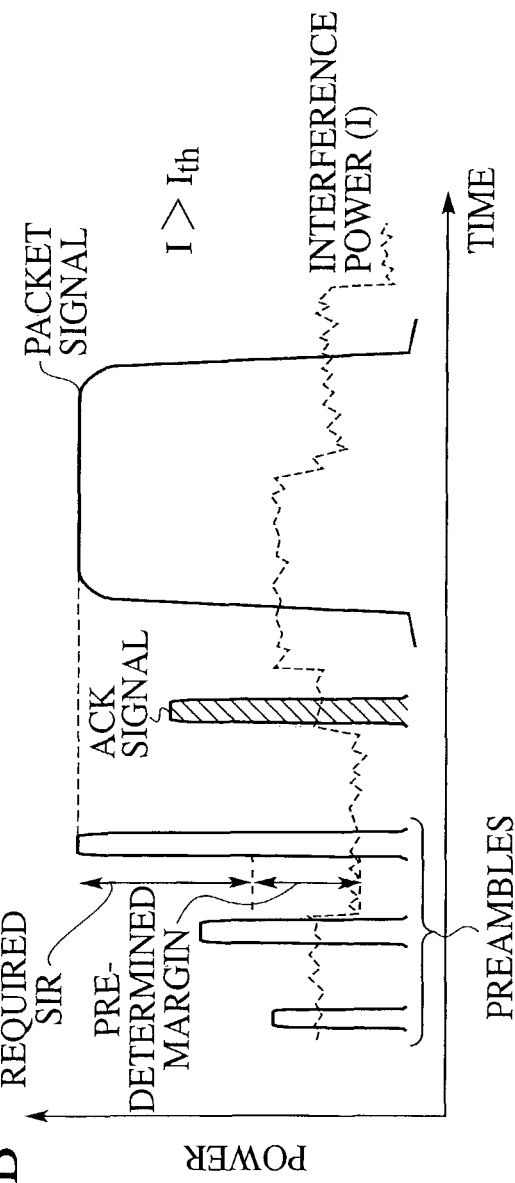

TRANSMISSION POWER CONTROL METHOD, RADIO COMMUNICATION SYSTEM, BASE STATION AND MOBILE STATION

CROSS REFERENCE TO RELATED APPLICATION

This application is based upon and claims the benefit of priority from the prior Japanese Patent Application No. P2002-215764, filed on Jul. 24, 2002; the entire contents of which are incorporated herein by reference.

BACKGROUND OF THE INVENTION

1. Field of the Invention

The present invention relates to a transmission power control method for controlling the transmission power of packet signals to be transmitted from a mobile station via an upstream radio channel, in a radio communication system for allowing radio communications between a base station and a plurality of mobile stations via code division multiple access (CDMA) radio channels. The present invention also relates to a radio communication system, a base station and a mobile station which can be used in the above transmission power control method.

2. Description of the Related Art

The conventional radio communication system for transmitting signals via CDMA radio channels differs from the radio communication systems for transmitting signals via time division multiple access (TDMA) radio channels or frequency division multiple access (FDMA) radio channels in the following way. In the conventional radio communication system, a receiver (for example, a base station) can decode despread signals which satisfy a required SIR (Signal to Interference Power Ratio) even though a transmitter (for example, a mobile station) transmits a plurality of signals at the same time.

In this case, the receiver observes signals other than required signals as interference signals, so that the required signals do not satisfy the required SIR when the received power of the signals other than the required signals is larger than the received power of the required signals. Therefore, a "near-far effect", in that the receiver can not decode the required signals, occurs.

To resolve the near-far effect., the transmitter is configured to control the transmission power of signals in the CDMA radio communication system.

Generally speaking, a first control method for controlling the transmission power of signals in each transmitter, so as to keep the received power of the signals in the receiver constant (predetermined received power), and a second control method for controlling the transmission power, so as to keep an SIR of the signals transmitted via each radio channel constant, are adopted as the control method of the transmission power of the above signals.

Normally, the CDMA radio communication system allows the transmitter to transmit signals with the minimum possible transmission power when the second control method is adopted, so as to improve the efficiency of usage of the available frequency, when compared to the first control method. Therefore, W-CDMA radio communication systems adopt the second control method.

However, the radio communication system adopting the second control method has a problem in that the transmitter determines the transmission power of the signals based on the interference power observed in the receiver, so that the interference power when the transmission power was determined often differs from the interference power during actual transmission of packet signals which are burst-type traffic. Thus, the required signals do not satisfy the required SIR in the receiver and there is a high possibility of the occurrence of communication errors when signals such as the packet signals are transmitted and the interference power observed in the receiver changes during a short period.

In other words, the second control method has a problem in that there is a possibility of causing lower throughput than a method without transmission power control in the transmitter.

To resolve the above problem, a method for determining transmission power with a predetermined margin can be considered. However, this method has a problem in that the determined transmission power becomes greater than necessary, so as to cause a reduction in channel-efficiency.

The method has a problem in that the required SIR and the predetermined margin are controlled based on the ratio (dB) between the received power and the interference power in the receiver, thus making it susceptible to burst-type interference signals (for example, packet signals) when the interference power is small.

On the other hand, the first control method has a problem in that the receiver can receive required signals (packet signals) when the interference power is smaller than a predetermined power, but the receiver can not receive required signals (packet signals) at all, when the interference power is larger than the predetermined power.

In other words, the radio communication system adopting the first control method has a problem in that the throughput characteristic is degraded abruptly in high traffic situations, differing from the radio communication system adopting the second control method which allows an increase in transmission power in the transmitters near the receiver, so as to satisfy the required SIR and prevent the abrupt degradation of throughput in high traffic situations.

The radio communication system adopting the first control method has a problem in that the transmitter can not transmit the required signals (packet signals), when the received power in the receiver does not satisfy the predetermined received power even though the receiver can receive the required signals (packet signals) correctly because the interference power in the receiver is small and satisfies the required SIR.

Therefore there is a problem in that the radio communication system adopting the first control method has a smaller communication area than the radio communication system adopting the second control method.

The radio communication system adopting the first and second control method has a problem in that the wasted transmission of the required signals (packet signals) in a transmitter which is far away from the receiver, and which does not satisfy the predetermined power and the required SIR, increases interference.

FIG. 1A is a graph showing a relationship between "traffic" and "throughput" in the radio communication system adopting the conventional first and second control method. FIG. 1B is a graph showing a relationship between "distance between a mobile station (a transmitter) and a base station (a receiver)" and an "average transmitter power in the mobile station" in the radio communication system adopting the conventional first and second control method.

As shown in FIG. 1A, the radio communication system adopting the first control method is characterized in that the throughput is high in low traffic situations, but the throughput is reduced abruptly in high traffic situations (referring to 801*a*).

As shown in FIG. 1A, the radio communication system adopting the second control method is characterized in that the throughput is lower than the radio communication system adopting the second control method in low traffic situations, but the throughput is not reduced abruptly in high traffic situations (referring to 801*b*).

As shown in FIG. 1B, the radio communication system adopting the first control method is characterized in that the average transmitter power in the plurality of mobile stations increases abruptly when the distance between the mobile station and the base station is longer than a predetermined distance (referring to 802*a*).

As shown in FIG. 1B, the radio communication system adopting the second control method is characterized in that the average transmitter power in the plurality of mobile stations increases gradually as the mobile stations recede from the base station (referring to 802*b*).

BRIEF SUMMARY OF THE INVENTION

In viewing of the foregoing, it is an object of the present invention to provide a transmission power control method which enables the resolution of problems in the first control method and the second control method, a radio communication system, a base station and a mobile station preferably used for the method.

A first aspect of the present invention is summarized as a transmission power control method for controlling the transmission power of packet signals to be transmitted from a mobile station via an upstream radio channel, in a radio communication system for allowing radio communications between a base station and a plurality of mobile stations via code division multiple access (CDMA) radio channels. The method comprises the step (A) of measuring the traffic volume of the packet signals in the base station; and the step (B) of switching between a first control method and a second control method based on the measured traffic volume in the base station, the first control method controlling the transmission power so as to keep the received power of the packet signals in the upstream radio channels constant, the second control method controlling the transmission power so as to keep a relationship between the received power of the packet signals and the interference power in the upstream radio channels constant. The relationship between the received power and the interference power includes indicators representing the ratio (SIR, CIR, Eb/No, SINR and CINR) and the difference.

A second aspect of the present invention is summarized as a transmission power control method for controlling the transmission power of packet signals to be transmitted from a mobile station via an upstream radio channel, in a radio communication system for allowing radio communications between a base station and a plurality of mobile stations via code division multiple access (CDMA) radio channels. The method comprises the step of controlling the transmission power so as to keep a difference between the received power of the packet signals and the interference power in the upstream radio channels constant.

A third aspect of the present invention is summarized as a radio communication system for allowing radio communications between a base station and a plurality of mobile stations via code division multiple access (CDMA) radio channels. The system comprises a measurer configured to measure the traffic volume of the packet signals transmitted from the mobile station via an upstream radio channel; and a switcher configured to switch between a first control method and a second control method based on the measured traffic volume, the first control method controlling the transmission power so as to keep the received power of the packet signals in the upstream radio channels constant, the second control method controlling the transmission power so as to keep a relationship between the received power of the packet signals and the interference power in the upstream radio channels constant.

A fourth aspect of the present invention is summarized as a base station for communicating with a plurality of mobile stations via code division multiple access (CDMA) radio channels. The base station comprises a measurer configured to measure the traffic volume of the packet signals transmitted from the mobile station via upstream radio channels; and a switcher configured to switch between a first control method and a second control method based on the measured traffic volume, the first control method controlling the transmission power of the packet signals in the mobile stations so as to keep the received power of the packet signals in the upstream radio channels constant, the second control method controlling the transmission power so as to keep a relationship between the received power of the packet signals and the interference power in the upstream radio channels constant.

In the fourth aspect, the measurer may measure an average interference power in the upstream radio channels per time unit as the traffic volume of the packet signals, and the switcher may switch between the first control method and the second control method, based on the average interference power and a predetermined threshold.

In the fourth aspect, the base station may further comprise a notification signal transmitter configured to transmit a notification signal for notifying the traffic volume of the packet signals measured by the measurer and the control method of the transmission power selected by the switcher; and an acknowledgement signal transmitting controller configured to judge whether or not to transmit an acknowledgement signal for indicating that the received power of an access control signal received from the mobile station satisfies a predetermined condition.

In the fourth aspect, the predetermined condition may be that the received power of the access control signal is smaller than a predetermined power, when the first control method is selected by the switcher.

In the fourth aspect, the predetermined condition may be determined based on the received power of the access control signal and the interference power in the upstream radio channels, when the second control method is selected by the switcher.

A fifth aspect of the present invention is summarized as a base station for communicating with a plurality of mobile stations via code division multiple access (CDMA) radio channels. The base station controls the transmission power of packet signals to be transmitted from the mobile station via an upstream radio channel so as to keep a difference between the received power and the interference power in the upstream radio channels constant.

A sixth aspect of the present invention is summarized as a mobile station for communicating with a base station via code division multiple access (CDMA) radio channels. The mobile station comprises a notification signal received power measurer configured to measure the received power of a notification signal transmitted from the base station; an extractor configured to extract the traffic volume of packet signals transmitted via an upstream radio channel and a control method of transmission power of the packet signals selected in the base station, from the notification signal; and a transmission judger configured to judge whether or not to transmit the packet signals, based on the received power of the notification signal, the traffic volume of the packet signals and the control method of the transmission power of the packet signals.

In the sixth aspect, the mobile station may further comprise an access control signal transmitter configured to transmit an access control signal with a predetermined transmission power via the upstream radio channel, before the transmission of the packet signals, when the transmission judger judges to transmit the packet signals; and a packet signal transmitter configured to transmit the packet signals with the predetermined transmission power, when it does not receive an acknowledgement signal for indicating that the received power of the access control signal in the base station satisfies a predetermined condition from the base station.

In the sixth aspect, the access control signal transmitter may increase the predetermined transmission power and transmit the access control signal again with the increased predetermined transmission power, when not receiving the acknowledgement signal during a predetermined period.

In the sixth aspect, the packet signal transmitter may transmit the packet signals with the predetermined transmission power, when the mobile station does not receive the acknowledgement signal during a predetermined period and the predetermined transmission power is the maximum transmission power in the mobile station.

BRIEF DESCRIPTION OF THE SEVERAL VIEWS OF THE DRAWINGS

FIG. 2 is a diagram for illustrating the entire structure of the radio communication system according to one embodiment of the present invention.

FIG. 8A is a diagram for showing various signals in the radio communication system according to the embodiment.

FIG. 8B is a diagram for showing various signals in the radio communication system according to the embodiment.

DETAILED DESCRIPTION OF THE INVENTION

Figure 1A:
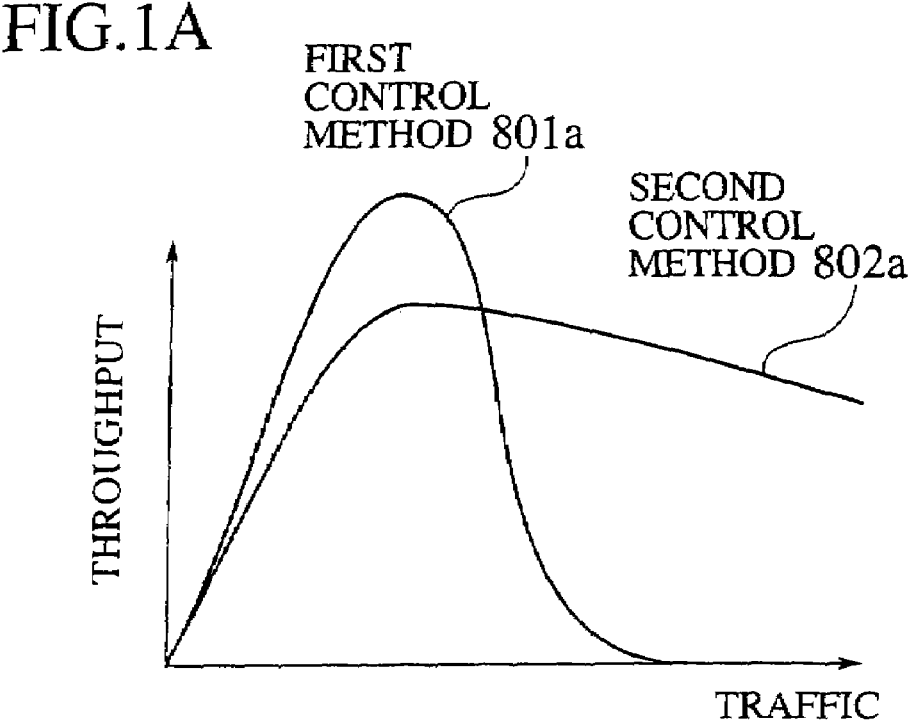
FIG. 1A is a graph for showing features of control methods of transmission power in a radio communication system according to a prior art.
Figure 1B:
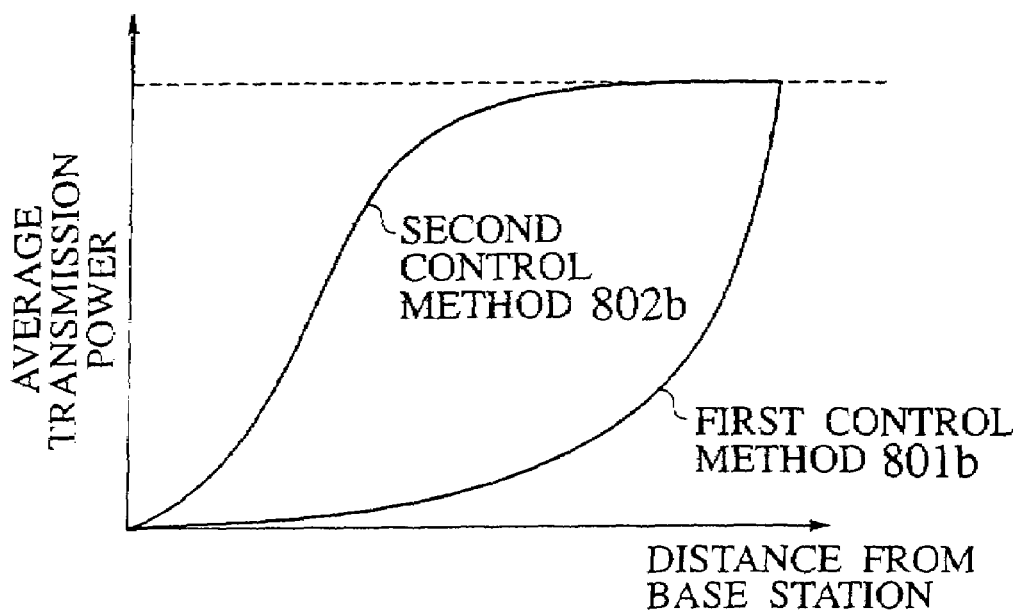
FIG. 1B is a graph for showing features of control methods of transmission power in the radio communication system according to a prior art.

<A Configuration of a Radio Communication System According to a First Embodiment of the Present Invention>

FIG. 2 shows an entire configuration of the radio communication system according to the first embodiment of the present invention.

As shown in FIG. 2, the radio communication system has a plurality of cells (radio zones) 1a to 1e which are formed by a plurality of base stations 10a to 10e. A plurality of mobile stations 30a to 30f exist in the respective cells 1a to 1e.

As shown in FIG. 2, the radio communication system according to the first embodiment allows radio communications between the base station 10 and the plurality of mobile stations 30 via CDMA radio channels.

As shown in FIG. 2, when the mobile station 30a existing in the cell 1a transmits packet signals A to the base station 10a which forms a cell 1a, packet signals B which are transmitted from the mobile station 30b existing in the cell 1a and the mobile station 30c existing in the cell 1b can be interference signals to the packet signals A.

Figure 3:
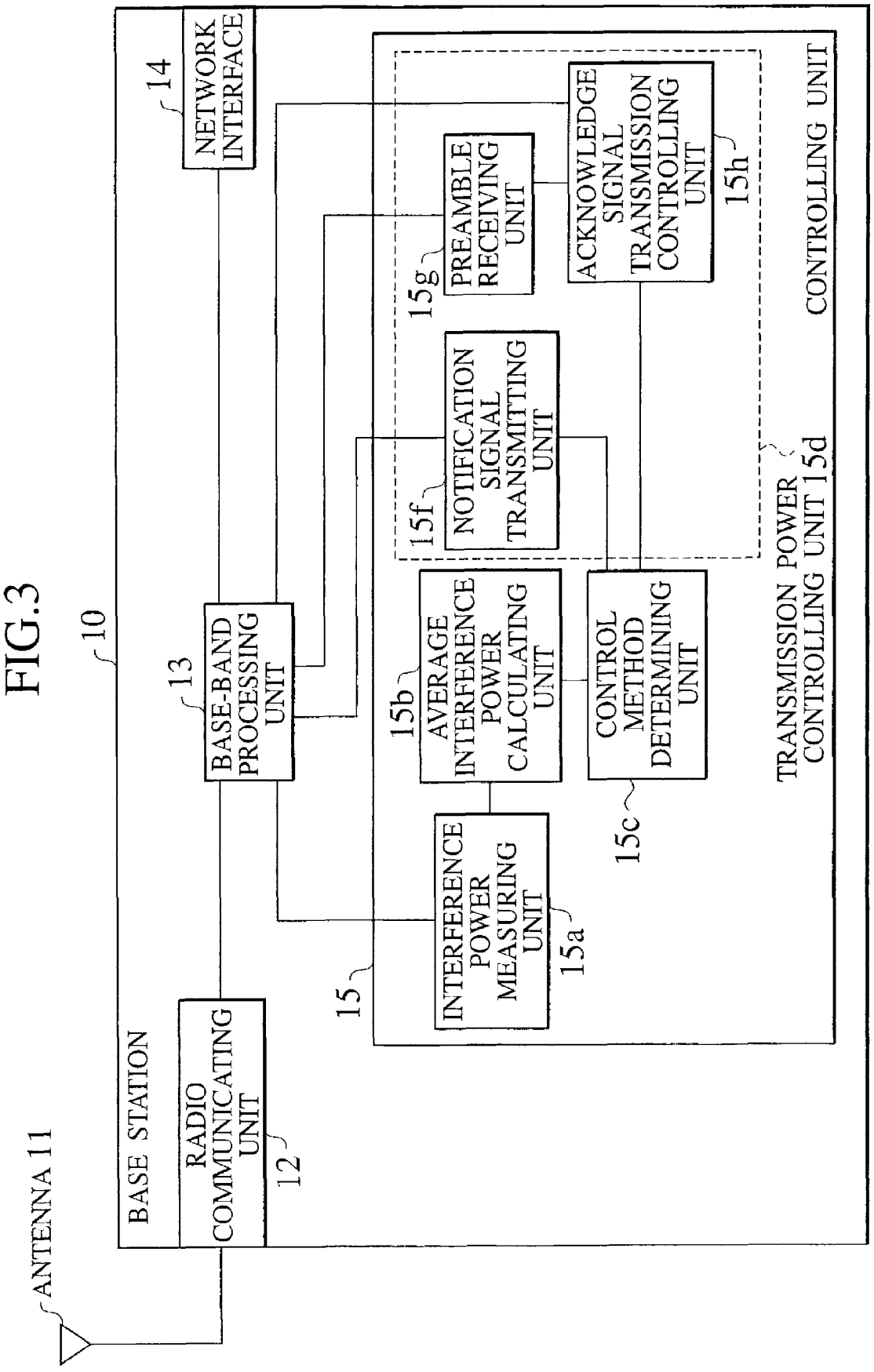
FIG. 3 is a functional block diagram of a base station in the radio communication system according to the embodiment.

FIG. 3 shows functional blocks of the base station 10 in the radio communication system according to the first embodiment.

As shown in FIG. 3, the base station 10 is configured with an antenna 11, a radio communicating unit 12, a base-band processing unit 13, a network interface 14 and a controlling unit 15.

The radio communicating unit 12, which is connected to the antenna 11 and the base-band processing unit 13, is configured to transmit radio signals to the mobile station 30 via a downstream radio channel and to receive radio signals from the mobile station 30 via an upstream radio channel.

The base-band processing unit 13, which is connected to the radio communicating unit 12, the network interface 14 and controlling unit 15, is configured to perform a base-band process on radio signals (user data or control data) transmitted from the radio communicating unit 12, so as to transmit the radio signals to the network interface 14 or the controlling unit 15.

The base-band processing unit 13 is configured to perform the base-band process on signals (user data or control data) transmitted from the network interface 14 or the controlling unit 15, so as to transmit the signals to the radio communicating unit 12.

The network interface 14, which is connected to the base-band processing unit 13, acts as an interface with radio communication networks which consist of radio network controllers and so on.

The controlling unit 15, which is connected to the base-band processing unit 13, is configured with an interference power measuring unit 15a, an average interference power calculating unit 15b, a control method determining unit 15c and a transmission power controlling unit 15d.

The interference power measuring unit 15a is configured to measure interference power in the upstream radio channels from the radio signals received via the radio communicating unit 12 and the base-band processing unit 13. The interference power in the upstream radio channels includes both the interference power within the same cell and the interference power from other cells.

The average interference power calculating unit 15b is configured to calculate an average interference power in the upstream radio channels measured by the interference power measuring unit 15a per time unit, as the traffic volume of the packet signals.

In the first embodiment, the interference power measuring unit 15a and the average interference power calculating unit 15b constitutes a measurer configured to measure the traffic volume of the packet signals transmitted from the mobile station 30 via the upstream radio channels.

The control method determining unit 15c constitutes a switcher configured to switch between a first control method and a second control method based on the measured traffic volume (the average interference power calculated by the average interference power calculating unit 15b).

The first control method controls the transmission power of the packet signals in the mobile station 30, so as to keep the received power of the packet signals in the upstream radio channels constant.

The second control method controls the transmission power of the packet signals in the mobile station 30, so as to keep a ratio between the received power of the packet signals and the interference power in the upstream radio channels constant.

To be more specific, the control method determining unit 15c switches between the first control method and the second control method, comparing the average interference power (I) with a predetermined threshold (Ith).

For example, the control method determining unit 15c can select the first control method when the average interference power (I) is smaller than or equal to the predetermined threshold (Ith), and select the second control method when the average interference power (I) is larger than the predetermined threshold (Ith).

In the first embodiment, the transmission power controlling unit 15d is configured to inform the mobile station 30 of the transmission power in the mobile station 30 using a "power lamping" in a random access technique of a W-CDMA system.

The transmission power controlling unit 15d is configured with a notification signal transmitting unit 15f, a preamble receiving unit 15g and an acknowledge signal transmission controlling unit.

The notification signal transmitting unit 15f constitutes a notification signal transmitter configured to transmit a notification signal.

The notification signal notifies the measured traffic volume of the packet signals (the average interference power calculated by the average interference power calculating unit 15b) and the control method of the transmission power selected in the base station 10 (the first control method or the second control method determined by the control method determining unit 15c).

The preamble receiving unit 15g is configured to receive preambles (access control signals) transmitted from the mobile station 30 with a predetermined transmission power, and measure the received power of the preambles.

The acknowledge signal transmission controlling unit 15h is configured to judge whether the received power of the preambles measured by the preamble receiving unit 15g satisfies a predetermined condition or not, and transmit an acknowledgement signal (an ACK signal) for indicating that the received power satisfies a predetermined condition.

For example, the predetermined condition can be that the received power is smaller than a predetermined power, when the first control method is selected by the control method determining unit 15c.

The predetermined condition can be determined based on the received power of the preambles and the interference power in the upstream radio channels, when the second control method is selected by the control method determining unit 15c.

The acknowledge signal transmission controlling unit 15h can transmit a NACK (not acknowledge) signal for indicating that the received power does not satisfy a predetermined condition.

The transmission power controlling unit 15d can use various methods, such as a method for transmitting TPC (Transmission Power Control) periodically, a method for informing the transmission power of the mobile station 30 using a response signal to a reservation signal in combination with a reservation-type access protocol and so on, instead of the power lamping.

Figure 4:
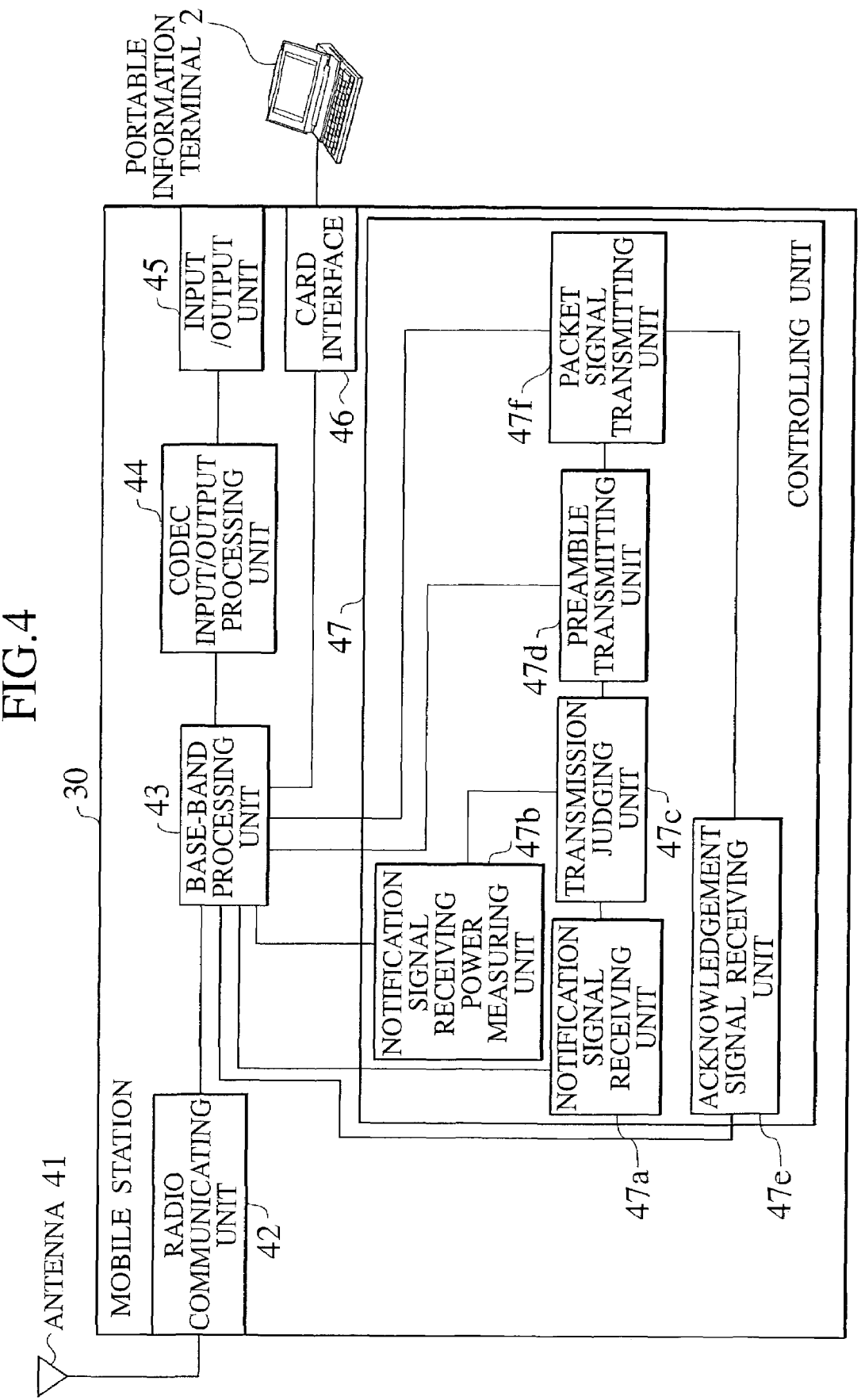
FIG. 4 is a functional block diagram of a mobile station in the radio communication system according to the embodiment.

FIG. 4 shows functional blocks of the mobile station 30 in the radio communication system according to the first embodiment.

As shown in FIG. 4, the mobile station 30 is configured with an antenna 41, a radio communicating unit 42, a base-band processing unit 43, a CODEC input/output processing unit 44, an input/output unit 45, a card interface 46 and a controlling unit 47.

The radio communicating unit 42, which is connected to the antenna 41 and the base-band processing unit 43, is configured to transmit the radio signals to the base station 10 via the upstream radio channel, and to receive the radio signals from the base station 10 via the downstream radio channel.

The base-band processing unit 43, which is connected to the radio communicating unit 42, the CODEC input/output processing unit 44, the card interface 46 and the controlling unit 47, is configured to perform a base-band process on radio signals (user data or control data) transmitted from the radio communicating unit 42, so as to transmit the radio signals to the CODEC input/output processing unit 44, the card interface 46 or the controlling unit 47.

The base-band processing unit 43 is configured to perform the base-band process on signals (user data or control data) transmitted from the CODEC input/output processing unit 44, the card interface 46 or the controlling unit 47, so as to transmit the signals to the radio communicating unit 42.

The CODEC input/output processing unit 44, which is connected to the base-band processing unit 43 and the input/output unit 45, is configured to perform an input process or an output process on audio signals between the base-band processing unit 43 and the input/output unit 45.

For example, the input/output unit 45 consists of a speaker outputting audio signals and a microphone inputting audio signals.

The card interface 46, which is connected to a portable information terminal 2 and the base-band processing unit 43, is configured to perform an input process or an output process on data signals between the portable information terminal 2 and the base-band processing unit 43.

The controlling unit 47, which is connected to the base-band processing unit 43, is configured with a notification signal receiving unit 47a, a notification signal received power measuring unit 47b, a transmission judging unit 47c, a preamble transmitting unit 47d, an acknowledgement signal receiving unit 47e and a packet signal transmitting unit 47f.

The notification signal receiving unit 47a is configured to receive the notification signal transmitted from the base station 10.

The notification signal receiving unit 47a constitutes an extractor configured to extract the traffic volume of packet signals transmitted via the upstream radio channels (the average interference power calculated by the average interference power calculating unit 15b) and the control method of transmission power of the packet signals selected in the base station 10 (the first control method or the second control method determined by the control method determining unit), from the received notification.

The notification signal received power measuring unit 47b is configured to measure the received power of the notification signal transmitted from the base station 10.

The transmission judging unit 47c is configured to judge whether or not to transmit the packet signals to the base station 10, based on the traffic volume of the packet signals extracted by the notification signal receiving unit 47a, the control method of the transmission power of the packet signals and the received power of the notification signal measured by the notification signal received power measuring unit 47b.

For example, the transmission judging unit 47c can judge to transmit the packet signals to the base station 10, when the first control method is selected, and when the required SIR is satisfied (even though the predetermined received power is not satisfied).

The transmission judging unit 47c determines a distance between the mobile station 30 and the base station 10 according to the received power of the notification signal, when the second control method is selected. Then the transmission judging unit 47c can judge to transmit the packet signals to the base station 10, when the determined distance is determined to be smaller than or equal to a predetermined value.

The preamble transmitting unit 47d is configured to transmit a preamble (an access control signal) with a predetermined transmission power (an initial power) via the upstream radio channel, before the transmission of the packet signals, when the transmission judging unit 47c judges to transmit the packet signals.

The preamble transmitting unit 47d increases the predetermined transmission power and transmits the preamble again with the increased predetermined transmission power, when the acknowledgement signal receiving unit 47e does not receive the ACK signal during a predetermined period.

The preamble transmitting unit 47d is configured to increase the predetermined transmission power and to transmit the preamble with the increased predetermined transmission power repeatedly, until the acknowledgement signal receiving unit 47e receives the ACK signal, or until the preamble is transmitted with the maximum transmission power in the mobile station 30.

The acknowledgement signal receiving unit 47e is configured to receive the ACK signal from the base station 10. The ACK signal indicates that the received power of the preamble satisfies the predetermined condition in the base station 10.

The packet signal transmitting unit 47f is configured to transmit the packet signals with the currently set transmission power to the base station 10, when the acknowledgement signal receiving unit 47e receives the ACK signal, or when the packet signal transmitting unit 47f receives the notification that the preamble transmitting unit 47d transmits the preamble with the maximum transmission power in the mobile station 30.

<An operation of a Radio Communication System According to the First Embodiment>

Figure 5:
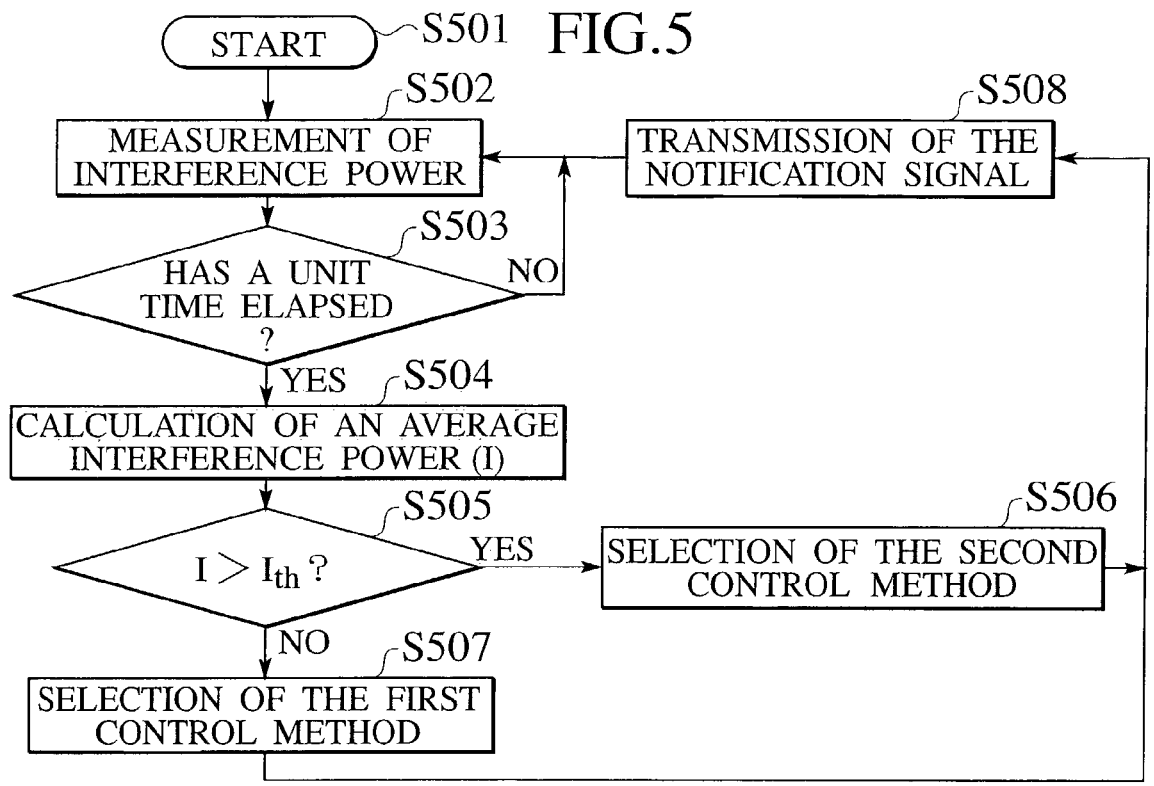
FIG. 5 is a flowchart for illustrating the operation in which the base station switches the control methods of transmission power of the packet signals in the radio communication system according to the embodiment.
Figure 6:
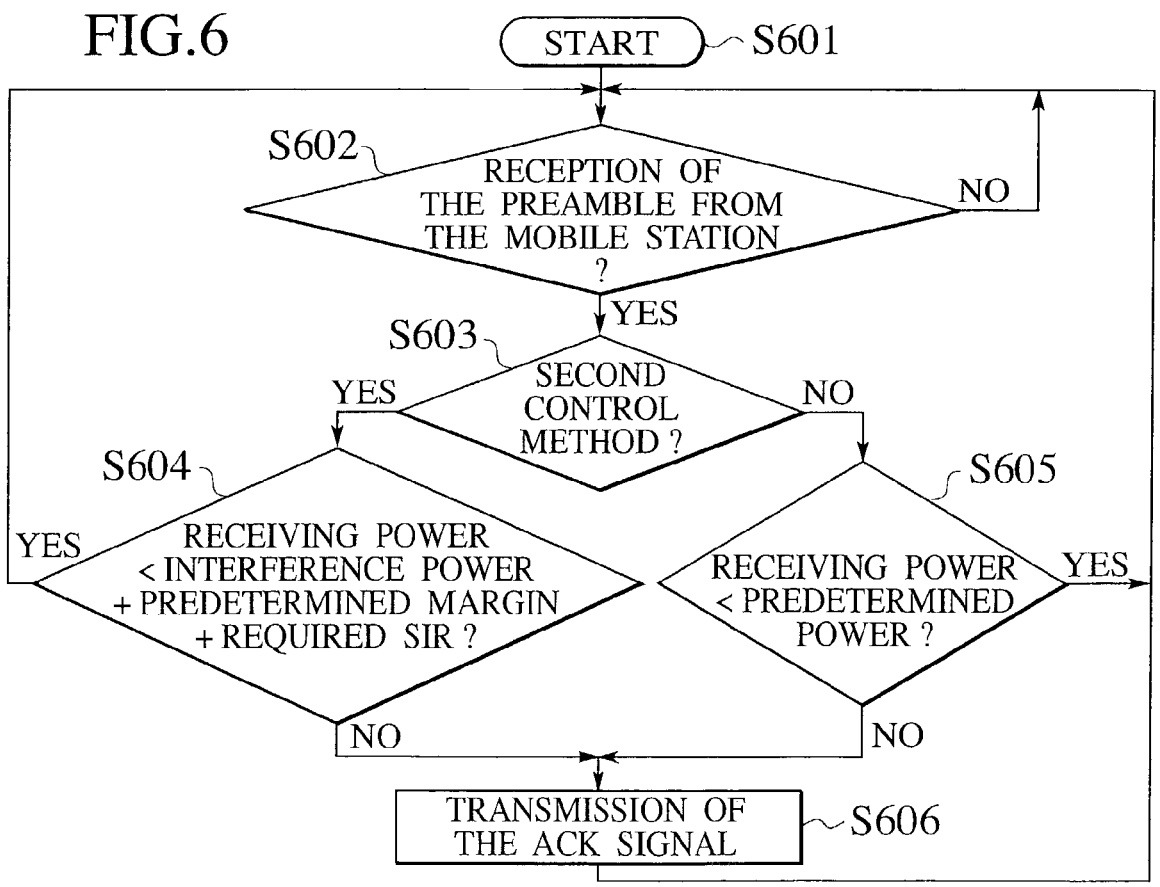
FIG. 6 is a flowchart for illustrating the operation in which the base station informs the mobile station of the transmission power of the packet signals in the radio communication system according to the embodiment.
Figure 7:
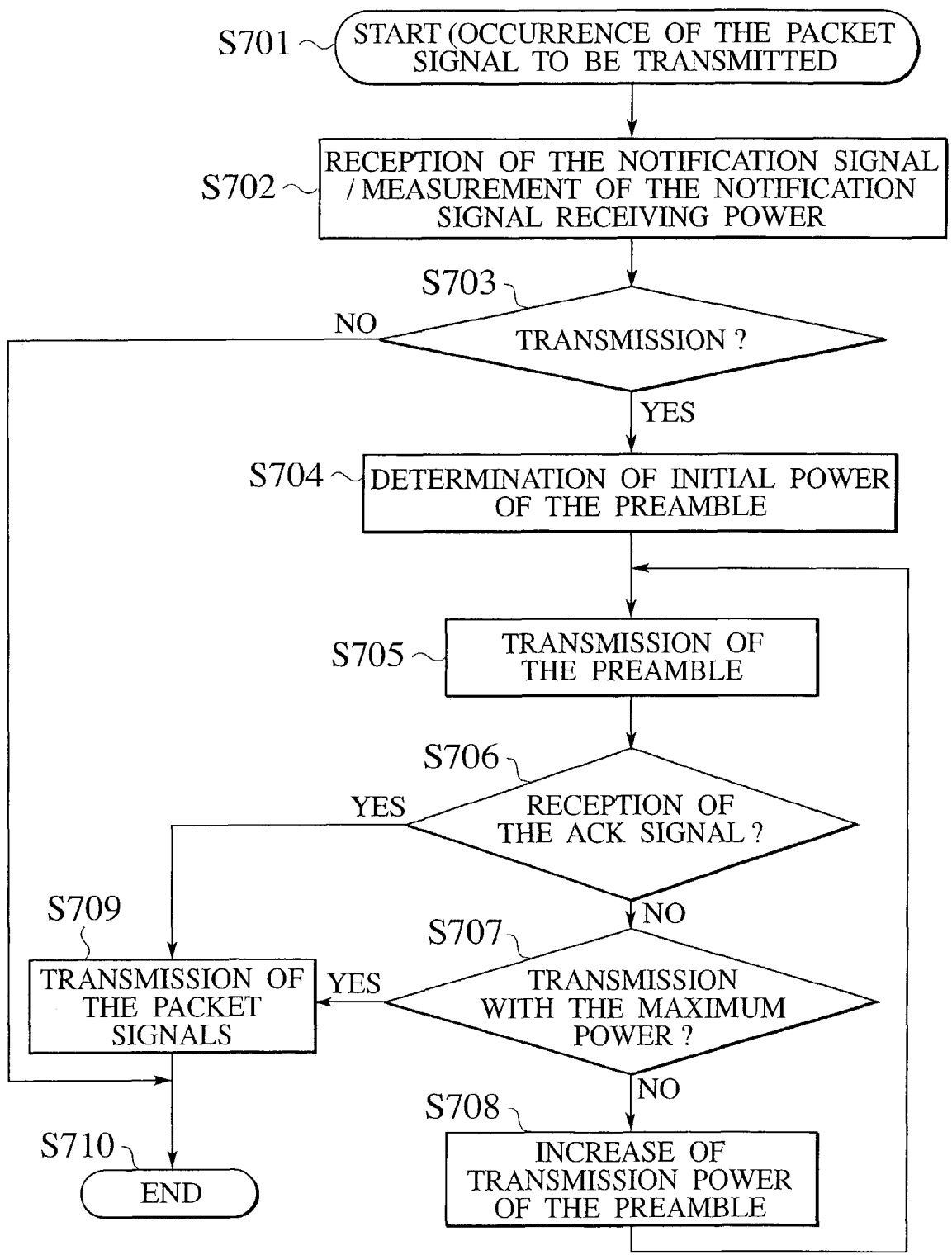
FIG. 7 is a flowchart for illustrating the operation in which the mobile station controls the transmission power of the packet signals in the radio communication system according to the embodiment.

Referring to FIG. 5 to FIG. 7, the operation of the radio communication system according to the first embodiment will be described.

First, referring to FIG. 5, the operation in which the base station 10 switches (selects) the control method of the transmission power of the packet signals (the first control method or the second control method) will be described.

In step S501, the operation starts.

In step S502, the interference power measuring unit 15a in the base station 10 measures the interference power in the upstream radio channels continuously.

In step S503, the average interference power calculating unit 15b monitors whether a time unit has elapsed or not with a timer. The operation returns to step S502 when the time unit has not elapsed.

When the time unit has elapsed, in step S504, the average interference power calculating unit 15b calculates the average interference power (I) per the time unit in the upstream radio channels measured by the interference power measuring unit 15a, as the traffic volume of the packet signals.

In step 505, the control method determining unit 15c compares the above average interference power (I) with the predetermined threshold (Ith).

When the average interference power (I) is larger than the predetermined threshold (Ith), in step S506, the control method determining unit 15c selects the second control method as the method for controlling the transmission power of the packet signals in the mobile station 30.

On the other hand, when the average interference power (I) is smaller than or equal to the predetermined threshold (Ith), in step S507, the control method determining unit 15c selects the first control method as the method for controlling the transmission power of the packet signals in the mobile station 30.

In step S508, the notification signal transmitting unit 15f transmits the notification signal which notifies the measured traffic volume (the average interference power calculated by the average interference power calculating unit 15b) and the control method of the transmission power of the packet signals selected by the base station 10 (the first control method or the second control method determined by the control method determining unit 15c), to the mobile station 30 via the downstream radio channel.

Second, referring to FIG. 6, the operation in which the base station 10 informs the mobile station 30 of the transmission power of the packet signals will be described.

In step S601, the operation starts.

In step S602, the preamble receiving unit 15g monitors whether the preamble is transmitted from the mobile station 30 or not.

When the preamble receiving unit 15g receives the preamble from the mobile station 30, in step S603, the acknowledge signal transmission controlling unit 15h judges whether the control method determining unit 15c is selecting the second control method or not.

When the acknowledge signal transmission controlling unit 15h judges that the second control method is selected in step S603, in step S604, the acknowledge signal transmission controlling unit 15h judges whether the received power of the preamble measured by the preamble receiving unit 15g satisfies the predetermined condition, for example, whether the sum of the "interference power (dB)", a "predetermined margin (dB)" and a "required SIR (dB)" is larger than the received power of the preamble. The value of the predetermined margin is expressed in the ratio of the predetermined margin to the interference power (dB).

When the sum is larger than the received power of the preamble, the acknowledge signal transmission controlling unit 15h does not transmit the ACK signal and the operation returns to step S602.

On the other hand, when the sum is not larger than the received power of the preamble, in step S606, the acknowledge signal transmission controlling unit 15h transmits the ACK signal to the mobile station 30 via the downstream radio channel.

When the acknowledge signal transmission controlling unit 15h judges that the first control method is selected in step S603, in step S605, the acknowledge signal transmission controlling unit 15h judges whether the received power of the preamble measured by the preamble receiving unit 15g satisfies the predetermined condition, for example, whether the received power of the preamble is larger than a predetermined power.

When the received power of the preamble is not larger than the predetermined power, the acknowledge signal transmission controlling unit 15h does not transmit the ACK signal and the operation returns to step S602.

On the other hand, when the received power of the preamble is larger than the predetermined power, in step S606, the acknowledge signal transmission controlling unit 15h transmits the ACK signal to the mobile station 30 via the downstream radio channel.

Third, referring to FIG. 7, the operation in which the mobile station 30 controls the transmission power of the packet signals will be described.

In step 701, when the base-band processing unit 43 in the mobile station 30 detects the occurrence of the packet signals to be transmitted, the operation starts.

In step 702, the notification signal receiving unit 47a receives the notification signal transmitted from the base station 10. The notification signal receiving unit 47a extracts the traffic volume transmitted via the upstream radio channels (the average interference power calculated by the average interference power calculating unit 15b) and the control method of the transmission power of the packet signals selected in the base station 10 (the first control method or the second control method determined by the control method determining unit 15c), from the received notification signal.

And, in step S702, the notification signal received power measuring unit 47b measures the received power (received electric field intensity) of the notification signal transmitted from the base station 10.

In step S703, the transmission judging unit 47c judges whether or not to transmit the packet signals to the base station 10, in accordance with the traffic volume and the control method of the transmission power of the packet signals extracted by the notification signal receiving unit 47a, and the received power of the notification signal measured by the notification signal received power measuring unit 47b.

For example, the transmission judging unit 47c estimates a transmission attenuation in the upstream radio channels (from the mobile station 30 to the base station 10), based on the received electric field intensity measured by the notification signal received power measuring unit 47b.

When the mobile station 30 transmits the packet signals with the maximum transmission power (the maximum output), the transmission judging unit 47c determines whether the packet signals satisfy the required SIR or not, based on the estimated transmission attenuation and the extracted interference power (traffic volume of the packet signals).

When the packet signal is determined not to be transmitted in step S703, the packet signals are not transmitted (but are instead queued) and the operation ends.

As a consequence, when there is a possibility that the packet signals received in the base station 10 can not satisfy the required SIR, the radio communication system according to the first embodiment stops the transmission of the packet signals, so as to avoid the needless transmission of the packet signals.

When there is a possibility that the packet signals received in the base station 10 can satisfy the required SIR, the radio communication system according to the first embodiment transmits the packet signals even though the packet signals do not satisfy the predetermined power (received power required by the base station 10), so as to achieve the transmission of the packet signals from the base station 10 to a mobile station 30 which is far from the base station 10.

When the packet signal is determined to be transmitted in step S703, in step 704, the preamble transmitting unit 47d determines the initial power of the preamble (predetermined transmission power) based on the estimated transmission attenuation.

In step S705, the preamble is transmitted with the predetermined transmission power via the upstream radio channel using the power lamping, before the transmission of the packet signals.

In step S706, the acknowledgement signal receiving unit 47e monitors the reception of the ACK signal from the base station 10.

When the acknowledgement signal receiving unit 47e receives the ACK signal from the base station 10, in step S709, the packet signal transmitting unit 47f transmits the packet signals with the currently set predetermined power which has the same power level as the preamble transmitted in step S705, to the base station 10.

On the other hand, when the acknowledgement signal receiving unit 47e does not receive the ACK signal from the base station 10 during the predetermined period, in step S707, the packet signal transmitting unit 47f judges whether the preamble transmitting unit 47d transmits the preamble with the maximum output or not.

When the packet signal transmitting unit 47f judges that the preamble transmitting unit 47d transmits the preamble with the maximum output in step S707, in step S709, the packet signal transmitting unit 47f transmits the packet signals with the currently set predetermined power which has the same power level (the maximum output) as the preamble transmitted in step S705, to the base station 10.

When the packet signal transmitting unit 47f judges that the preamble transmitting unit 47d does not transmit the preamble with the maximum output in step S707, in step S708, the preamble transmitting unit 47d increases the predetermined transmission power of the preamble, and then the operation returns to step S705.

FIG. 8A shows various signals in the radio communication system in which the first control method is selected, FIG. 8B shows various signals in the radio communication system in which the second control method is selected.

<Functions and Effects of the Radio Communication System According to the First Embodiment>

The radio communication system according to the first embodiment allows the switching (change) of the control method of the transmission power in accordance with the measured traffic volume of the packet signals, so as to keep a high throughput using the first control method in low traffic situations, and to prevent an abrupt degradation of a throughput using the second control method in high traffic situations.

To be more specific, the radio communication system according to the first embodiment allows the switching (change) of the control method of the transmission power in, accordance with the average interference power (I) calculated by the average interference power calculating unit 15b, so as to keep a high throughput using the first control method in low traffic situations, and to prevent an abrupt degradation of a throughput using the second control method in high traffic situations.

The radio communication system according to the first embodiment allows the estimation of the traffic volume of the packet signals, in consideration of the interference power from mobile stations 30 belonging to other cells.

The radio communication system according to the first embodiment allows the cessation of the transmission of the packet signals in the mobile station 30 which is far away from the base station 10, when selecting the second control method in high traffic conditions, so as to reduce the interference power.

The radio communication system according to the first embodiment allows the mobile station 30 which satisfies the following condition to transmit the packet signals, when selecting the second control method in high traffic conditions, so as to expand the communication area of the mobile station 30. The above condition is that the required SIR is satisfied in the mobile station 30 even though the mobile station 30 is far away from the base station and the received power does not satisfy the predetermined power.

The radio communication system according to the first embodiment allows the cessation of the transmission of the packet signals in the mobile station 30 which is estimated not to satisfy the required SIR because of large interference power, so as to avoid the needless use of the radio resource.

<A Modification 1>

The present invention is not limited to the above embodiment, and can be configured to adopt the method for controlling the transmission power of the packet signals in the mobile station 30 so as to keep a difference between the received power of the packet signals and the interference power in the upstream radio channels constant, instead of the method for controlling the transmission power of the packet signals in the mobile station 30 so as to keep a ratio (SIR) between the received power of the packet signals and the interference power in the upstream radio channels constant, as the second control method.

In this case, the above predetermined margin is designated as the difference between the predetermined margin and the interference power (I), instead of the ratio (dB) between the predetermined margin and the interference power (I).

The radio communication system according to the modification 1 allows the adoption of the second control method for controlling the transmission power of the packet signals in the mobile station 30 so as to keep a difference between the received power of the packet signals and the interference power in the upstream radio channels constant, so as to set the predetermined margin effectively when the interference power is small.

The radio communication system according to the modification 1 allows the determination of the predetermined margin using not the ratio, but the difference, so as to reduce the probability that the base station 10 will not satisfy the required SIR when the packet signals transmitted with a small transmission power are overlapped with the following packet signals, and thus improve an error rate of the packet signals in low traffic situations.

The invention of the base station according to the present invention is applied to the mobile station which acts as a relay station in multi-hop connections or ad-hoc connections.

The present invention can provide a transmission power control method for enabling the resolution, of problems in the first control method and the second control method.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A transmission power control method for controlling the transmission power of packet signals to be transmitted from a mobile station via an upstream radio channel, in a radio communication system for allowing radio communications between a base station and a plurality of mobile stations via code division multiple access (CDMA) radio channels, the method comprising:

measuring the traffic volume of the packet signals in the base station;

switching between a first control method and a second control method based on the measured traffic volume in the base station, the first control method controlling the transmission power so as to keep the received power of the packet signals in the upstream radio channels constant, the second control method controlling the transmission power so as to keep a ratio between the received power of the packet signals and the interference power in the upstream radio channels constant;

transmitting a notification signal for notifying the measured traffic volume of the packet signals and the control method selected by the switching; and judging whether to transmit an acknowledgement signal indicating that a received power of an access control signal received from the mobile station satisfies a predetermined condition.

2. A transmission power control method for controlling the transmission power of packet signals to be transmitted from a mobile station via an upstream radio channel, in a radio communication system for allowing radio communications between a base station and a plurality of mobile stations via code division multiple access (CDMA) radio channels, the method comprising:

measuring the traffic volume of the packet signals in the base station; and switching between a first control method and a second control method based on the measured traffic volume in the base station, the first control method controlling the transmission power so as to keep the received power of the packet signals in the upstream radio channels constant, and the second control method controlling the transmission power so as to keep a difference between the received power of the packet signals and the interference power in the upstream radio channels constant;

transmitting a notification signal for notifying the measured traffic volume of the packet signals and the control method selected by the switching; and judging whether to transmit an acknowledgement signal indicating that a received power of an access control signal received from the mobile station satisfies a predetermined condition.

3. A radio communication system for radio communications between a base station and a plurality of mobile stations via code division multiple access (CDMA) radio channels, the system comprising:

a measurer configured to measure traffic volume of packet signals transmitted from the mobile stations via upstream radio channels;

a switcher configured to switch between a first control method and a second control method based on the measured traffic volume, the first control method controlling the transmission power of the packet signals in the mobile stations so as to keep the received power of the packet signals in the upstream radio channels constant, the second control method controlling the transmission power of the packet signals in the mobile stations so as to keep a relationship between the received power of the packet signals and the interference power in the upstream radio channels constant;

a notification signal transmitter configured to transmit a notification signal for notifying the traffic volume of the packet signals measured by the measurer and the control method of the transmission power selected by the switcher; and an acknowledgement signal transmitting controller configured to judge whether or not to transmit an acknowledgement signal for indicating that a received power of an access control signal received from one of the plurality of mobile stations satisfies a predetermined condition.

4. A base station for communicating with a plurality of mobile stations via code division multiple access (CDMA) radio channels, the base station comprising:

a measurer configured to measure traffic volume of packet signals transmitted from the mobile stations via upstream radio channels;

a switcher configured to switch between a first control method and a second control method based on the measured traffic volume, the first control method controlling the transmission power of the packet signals in the mobile stations so as to keep the received power of the packet signals in the upstream radio channels constant, the second control method controlling the transmission power of the packet signals in the mobile stations so as to keep a ratio between the received power of the packet signals and the interference power in the upstream radio channels constant;

a notification signal transmitter configured to transmit a notification signal for notifying the traffic volume of the packet signals measured by the measurer and the control method of the transmission power selected by the switcher; and an acknowledgement signal transmitting controller configured to judge whether or not to transmit an acknowledgement signal for indicating that received power of an access control signal received from one of the plurality of mobile stations satisfies a predetermined condition.

5. The base station according to claim 4, wherein
the measurer measures an average interference power in the upstream radio channels per time unit as the traffic volume of the packet signals, and the switcher switches between the first control method and the second control method, based on the average interference power and a predetermined threshold.

6. The base station according to claim 4, wherein the predetermined condition is that the received power of the access control signal is smaller than a predetermined power, when the first control method is selected by the switcher.

7. The base station according to claim 4, wherein the predetermined condition is determined based on the received power of the access control signal and the interference power in the upstream radio channels, when the second control method is selected by the switcher.

8. A base station for communicating with a plurality of mobile stations via code division multiple access (CDMA) radio channels, comprising:

a measuring unit configured to measure traffic volume of packet signals transmitted from the mobile stations via upstream radio channels;

a switcher configured to switch between a first control method and a second control method based on the measured traffic volume, the first control method controlling the transmission power of the packet signals in the mobile stations so as to keep the received power of the packet signals in the upstream radio channels constant, the second control method controlling the transmission power of packet signals to be transmitted from the mobile station via an upstream radio channel, so as to keep a difference between the received power and the interference power in the upstream radio channels constant;

a notification signal transmitter configured to transmit a notification signal for notifying the traffic volume of the packet signals measured by the measurer and the control method of the transmission power selected by the switcher; and an acknowledgement signal transmitting controller configured to judge whether or not to transmit an acknowledgement signal for indicating that a received power of an access control signal received from one of the plurality of mobile stations satisfies a predetermined condition.

9. A mobile station for communicating with abase station via code division multiple access (CDMA) radio channels, the mobile station comprises:

a notification signal received power measurer configured to measure the received power of a notification signal transmitted from the base station;

an extractor configured to extract the traffic volume of packet signals transmitted via upstream radio channels and a control method of the transmission power of the packet signals selected in the base station, from the notification signal;

a transmission judger configured to judge whether or not to transmit the packet signals, based on the received power of the notification signal, the traffic volume of the packet signals and the control method of the transmission power of the packet signals;

an access control signal transmitter configured to transmit an access control signal with a predetermined transmission power via the upstream radio channel, before the transmission of the packet signals, when the transmission judger judges to transmit the packet signals; and a packet signal transmitter configured to transmit the packet signals with the predetermined transmission power, when receiving an acknowledgement signal for indicating that the received power of the access control signal in the base station satisfies a predetermined condition from the base station.

10. The mobile station according to claim 9, wherein the access control signal transmitter increases the predetermined transmission power and transmits the access control signal again with the increased predetermined transmission power, when not receiving the acknowledgement signal during a predetermined period.

11. The mobile station according to claim 9, wherein the packet signal transmitter transmits the packet signals with the predetermined transmission power, when the mobile station does not receive the acknowledgement signal during a predetermined period and the predetermined transmission power is the maximum transmission power in the mobile station.

* * * * *